United States Patent Office 3,433,829
Patented Mar. 18, 1969

3,433,829
PROCESS FOR THE PREPARATION OF
DIACETYL COMPOUNDS
Christoph Dörfelt, Burghausen, Salzach, Germany, assignor to Farbwerke Hoechst Aktiengesellschaft vormals Meister Lucius & Brüning, Frankfurt am Main, Germany, a corporation of Germany
No Drawing. Filed Dec. 14, 1965, Ser. No. 513,827
Claims priority, application Germany, Dec. 30, 1964,
F 44,840
U.S. Cl. 260—496     5 Claims
Int. Cl. C07c 67/00

ABSTRACT OF THE DISCLOSURE

A process for producing mixed mono or polybutylene glycol diacetates by reacting tetrahydrofuran and acetic anhydride in the presence of a catalytic amount of bleaching earth.

---

The present invention relates to a process for the preparation of diacetyl compounds, in particular, it relates to a new and improved method for preparing diacetyl compounds of the general formula

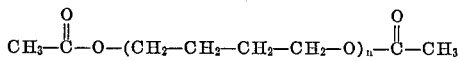

in which $n$ represents a whole number from 1 to 10.

It is known from the U.S. Patent No. 2,499,725 that 1.4-butylene-glycol diacetate of the formula

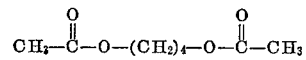

and 1.4-dibutylene-glycol diacetate of the formula

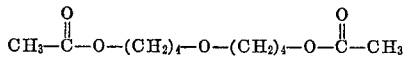

can be prepared by reacting tetrahydrofuran with acetic anhydride in the presence of boron fluoride.

It has now been found that for the preparation of the aforesaid diacetyl compounds from tetrahydrofuran and acetic anhydride bleaching earths can also be used as catalysts. In particular, aluminum hydrosilicates or aluminum magnesium hydrosilicates of the Montmorillonite type, which may be activated by an acid and which are in trade, for example, under the name of "Tonsil," are suitable for this process. It is known that bleaching earths are used in industry as catalysts for alkylating phenols or aromatic amines or for preparing acetals. Their efficiency as catalysts in the reaction of tetrahydrofuran with acetic anhydride has, however, not yet been known and is, therefore, surprising, since the experiences hitherto made suggested that only substances having a stronger catalytic action, for example boron fluoride, make possible the cleavage of the tetrahydrofuran ring by means of acetic anhydride. As compared to this catalyst, the bleaching earths have the advantage of being considerably less expensive and easier to handle.

For carrying out the process, acetic anhydride and tetrahydrofuran are allowed to act on each other in the presence of small amounts of bleaching earth. As a rule, the catalyst is used in amounts ranging from 0.2 to 5% by weight, referred to the total mixture. The reaction already proceeds at room temperature, but in order to increase the reaction amount, it is suitable to operate at elevated temperatures, for example, to reflux the batch for some time. In general, the reaction can be carried out within a range of 20° C. to 200° C. and its duration depends on the temperature. The more the temperature is elevated, the quicker the reaction proceeds and the sooner it is complete. Subsequently, the reaction mixture is filtered off from the bleaching earth and is fractionated. After possible first runnings of tetrahydrofuran and acetic anhydride which have not reacted, first, 1.4-butylene-glycol diacetate (boiling point 108–110° C. at 9 mm. of mercury) and then 1.4-dibutylene-glycol diacetate (boiling point 145–150° C. at 5 mm. of mercury) are distilled over. On further distillation, tributylene-glycol diacetate of the formula

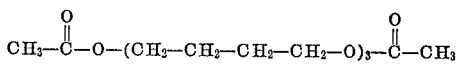

of the boiling point 169–170° C. at 1.5 mm. of mercury and tetrabutylene-glycol diacetate of the formula

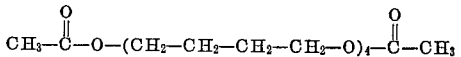

of the boiling point 223–225° C. at 1.5 mm. of mercury can be isolated. The residue consists of a mixture of polymers having a molecular weight of 600–700, and it contains other polybutylene-glycol diacetates going up to about the decabutylene-glycol diacetate.

The composition of the mixture of polymers depends on the nature and on the amount of the bleaching earth used and on the reaction temperature applied. In general, the portion of dibutylene-glycol diacetate and of the higher-polymeric diacetates is greater when less of catalyst is used or when operating at lower temperatures.

The quantitative proportion of acetic anhydride to tetrahydrofuran can be varied depending on the nature of the final product to be prepared. The longer the polybutylene-glycol chain is intended to be, the greater is the amount of tetrahydrofuran to be used. When preparing 1.4-butylene-glycol diacetate, it is suitable to use an excess amount of acetic anhydride. This excess raises the temperature of the refluxing mixture and the reaction proceeds more rapidly.

The process can be carried out by adding the substances in charges or continuously. In the latter case, a mixture of tetrahydrofuran and acetic anhydride is passed through a heated tube which is filled with the bleaching earth, if desired, in the form of shaped bodies.

The diacetates which can be prepared according to the process of the invention, can be converted into the corresponding dihydroxy compounds in known manner (see U.S. Patent No. 2,499,725 and Journ. Amer. Chem. Soc., vol. 70, p. 1842), by transesterification with methanol. These dihydroxy compounds are important intermediates of which, if desired, in admixture with other polyhydroxy compounds, higher-molecular products of particularly valuable properties, which are used as plastics, are prepared by reaction with polycarboxylic acids or the esters thereof, epichlorhydrine or isocyanates.

The following examples serve to illustrate the invention, but they are not intended to limit it thereto.

EXAMPLE 1

144 grams of tetrahydrofuran, 204 grams of acetic anhydride and 10 grams of a commercial acid bleaching earth of the Montmorillonite type were stirred in a glass flask at room temperature, after having determined the degree of acid of this bleaching earth by titration with a potassium hydroxide solution (14.1 milligrams of potassium hydroxide was required for neutralizing 1 gram of the catalyst). In certain intervals, samples were taken from the reaction mixture and were used for determining the content of 1.4-butylene-glycol diacetate and 1.4-dibutylene-glycol diacetate by chromatographic analyses. The result is shown in the following table:

| Period of time (hours) | 1.4-butylene-glycol diacetate, percent | 1.4-dibutylene-glycol diacetate, percent |
|---|---|---|
| 4 | 5.8 | 10.6 |
| 30 | 3.6 | 22.4 |
| 56 | 5.6 | 37.6 |

The table shows that the bleaching earth used effected the cleavage of the tetrahydrofuran ring by the acetic anhydride already at room temperature and that considerably more 1.4-dibutylene-glycol diacetate was formed in this process than 1.4-butylene-glycol diacetate.

EXAMPLE 2

316.8 kilograms of tetrahydrofuran, 448.8 kilograms of acetic anhydride and 15.3 kilograms of an acid Montmorillonite earth (trademark "Tonsil") were stirred in an enamelled vessel having a capacity of 800 liters, provided with a jacket-heating, a stirrer and a reflux cooler (50.0 milligrams of potassium hydroxide was required for neutralizing 1 gram of this bleaching earth). The vessel was slowly heated while stirring. After a period of 2½ hours, the internal temperature amounted to 86° C. and a mixture of tetrahydrofuran and acetic anhydride boiled vigorously under reflux.

On further heating, the reflux ceased gradually and had almost terminated after 6 hours at an internal temperature of 120° C. Heating of the reaction mixture was continued for 2 hours while the temperature rose to 160° C. Subsequently, the mixture was cooled and the reaction product was separated from the bleaching earth by filtration over a pressure suction filter. The filtrate was fractionated in a glass column. After the excess amount of acetic anhydride had been removed, first, 125 kilograms of 1.4-butylene-glycol diacetate (16.3% of the theory) and subsequently, 373 kilograms of 1.4-dibutylene-glycol diacetate were distilled over (69% of the theory). The two diacetates could be converted into 1.4-butylene-glycol or 1.4-dibutylene-glycol by trans-esterification with methanol. The above distillation residue contained tributylene-glycol diacetate, tetrabutylene-glycol diacetate and even higher-molecular polybutylene-glycol diacetates which may also be converted into the corresponding dihydroxy compounds.

EXAMPLE 3

For continuously preparing the instant diacetates, a vertical glass tube having a diameter of 5.5 cm. and a length of 1 meter and being provided with a heating jacket, was filled with a granulated bleaching earth (the diameter of a particle was about 5 mm.). 143 grams of an equimolecular mixture of acetic anhydride and of tetrahydrofuran were hourly passed through this catalyst space at a temperature of 40° C. The reaction mixture discharging from the glass tube, contained 9.7% of 1,4-butylene-glycol diacetate and 29.4% of dibutylene-glycol diacetate. Both products could be separated by fractionated distillation. The first runnings of tetrahydrofuran and acetic anhydride obtained were used for another passage. Yields and throughputs increased when pulverulent bleaching earth was used instead of the granulated one.

I claim:

1. In a process for preparing mono- and poly-butylene glycol diacetates by contacting tetrahydrofuran with acetic anhydride at about 20–200° C., the improvement comprising effecting the reaction in the presence of a catalytic amount of a bleaching earth consisting essentially of aluminum hydrosilicates, aluminum-magnesium hydrosilicates or acid activated forms thereof.

2. The process of claim 1, comprising utilizing 0.2–5% by weight of bleaching earth as catalyst.

3. The process of claim 1, wherein the bleaching earth is a montmorillonite.

4. The process of claim 1 wherein montmorillonite catalyst is acid activated.

5. The process of claim 1 wherein the bleaching earth is in pulverulent form.

References Cited

UNITED STATES PATENTS

| 1,710,424 | 4/1929 | Loehr | 260—496 |
| 2,499,725 | 3/1950 | Copelin | 260—496 |
| 2,525,145 | 10/1950 | Mavity | 260—497 |
| 2,576,268 | 11/1951 | Shugar et al. | 260—410.6 |
| 2,778,855 | 1/1957 | Shokal et al. | 260—410.6 |
| 2,993,913 | 7/1961 | Dunlop | 260—635 |

FOREIGN PATENTS 905,854  9/1962  Great Britain.

LORRAINE A. WEINBERGER, *Primary Examiner.*

VIVIAN GARNER, *Assistant Examiner.*

U.S. Cl. X.R.

260—615, 635